United States Patent

Shiota et al.

[11] Patent Number: 5,807,617
[45] Date of Patent: Sep. 15, 1998

[54] HOLLOW STRUCTURAL COMPONENT

[75] Inventors: Tomio Shiota, Takatsuki; Toshiharu Hikida, Kyoto; Masashi Sugimoto, Suita; Kazuhiko Kodama, Kyoto; Kaoru Shimizu, Osaka, all of Japan

[73] Assignee: Matsushita Electric Industrial Co., Ltd., Osaka-fu, Japan

[21] Appl. No.: 468,955

[22] Filed: Jun. 6, 1995

Related U.S. Application Data

[62] Division of Ser. No. 231,581, Apr. 20, 1994, abandoned.

[30] Foreign Application Priority Data

Jan. 28, 1991 [JP] Japan .................................... 3-008316
Mar. 20, 1991 [JP] Japan .................................... 3-056617

[51] Int. Cl.⁶ .............................. B29D 22/00; H04R 1/02
[52] U.S. Cl. ......................... 428/35.7; 428/178; 428/188; 428/73; 428/116; 428/118; 428/119; 428/166; 108/51.1; 108/901; 312/107; 312/108; 312/265.5; 312/265.6; 381/88; 381/89; 381/90
[58] Field of Search .................... 428/35.7, 178, 428/188, 73, 116, 118, 119, 166; 108/901, 51, 52; 312/107, 108, 265.5, 265.6; 381/88, 89, 90

[56] References Cited

U.S. PATENT DOCUMENTS

| | | | |
|---|---|---|---|
| 2,872,516 | 2/1959 | Hoffman | 381/89 |
| 3,135,640 | 6/1964 | Kepka et al. | 264/45.2 |
| 3,538,668 | 11/1970 | Anderson | 52/800 |
| 3,606,460 | 9/1971 | Shannon | 297/445 |
| 4,051,787 | 10/1977 | Nishitani et al. | 108/55.3 |
| 4,052,523 | 10/1977 | Rhodes et al. | 428/116 |
| 4,136,220 | 1/1979 | Olabisi | 428/35 |
| 4,247,515 | 1/1981 | Olabisi | 264/500 |
| 4,287,836 | 9/1981 | Aoki | 108/51.1 |
| 4,397,246 | 8/1983 | Ishida et al. | 108/553 |
| 4,423,000 | 12/1983 | Teraoka | 264/524 |
| 4,474,717 | 10/1984 | Hendry | 264/45.5 |
| 4,707,393 | 11/1987 | Vetter | 428/178 |
| 4,824,732 | 4/1989 | Hendry et al. | 428/542.8 |
| 4,843,624 | 6/1989 | Rashak | 381/91 |
| 4,849,269 | 7/1989 | Grace | 428/81 |
| 4,923,666 | 5/1990 | Yamazaki et al. | 264/572 |
| 5,030,495 | 7/1991 | Neu | 428/76 |
| 5,046,104 | 9/1991 | Kloss | 381/90 |
| 5,069,859 | 12/1991 | Loren | 264/572 |
| 5,119,421 | 6/1992 | Reime | 381/24 |
| 5,153,052 | 10/1992 | Tanaka et al. | 428/212 |

FOREIGN PATENT DOCUMENTS

| | | |
|---|---|---|
| 61-155035 | 7/1986 | Japan . |
| 1-204871 | 8/1989 | Japan . |
| 3-23925 | 1/1991 | Japan . |
| 3-7323 | 1/1991 | Japan . |

*Primary Examiner*—S. Mark Clardy
*Assistant Examiner*—Michael A. Williamson
*Attorney, Agent, or Firm*—Ratner & Prestia

[57] ABSTRACT

A hollow structural component which includes an integral structure, partition walls intersecting each other within the integral structure, and a plurality of independent hollow portions formed as specified by the partition walls so as to be arranged within the integral structure. The integral structure is formed into one piece by one-shot molding or by one injection molding die which is caused to slide against each other between its stationary side and movable side for post-forming, whereby weight reduction of the hollow structural component, reduction in the amount of resin used, reduction in the number of parts involved, and improvement in the workability for assembling may be achieved with consequent cost reduction.

2 Claims, 15 Drawing Sheets

⇩ To be slid after completion of primary molding

Die closed state in preparation for secondary molding

Coupled state of respective halves of hollow structure in preparation for secondary molding

HOLLOW STRUCTURAL COMPONENT

This application is a division of application Ser. No. 08/231,581 filed Apr. 20, 1994, now abandoned.

BACKGROUND OF THE INVENTION

The present invention generally relates to a structural part or component, and more particularly, to a hollow structural component having hollow portions formed therein, to be used for constructing a structure such as a stand for a television receiver and the like.

It has been a recent trend that stands for television receivers, etc. are diversified in the design thereof, and are required to have an appearance as one unit with the television receivers, for example, as shown in FIG. 15(A) to be described later for one embodiment of the present invention.

In order to meet such diversification in the design, with simultaneous guarantee for sufficient mechanical strength, there has conventionally been proposed a wooden structure which includes a main frame 161 constituted by solid timber having ample strength, and thin sheets 162, 163 and 164 of plywood or the like applied onto the main frame 161 to cover respective surfaces thereof as shown in FIGS. 16(A) and 16(B).

Other known constructions employed for this purpose are, for example, as follows. As shown in FIG. 17, a plate-like structure 171 formed therein with a plurality of hollow portions 173 as specified is prepared through employment of an extrusion molding technique, and lid members 172 are fitted to opposite end faces of said plate-like member 171. As illustrated in FIGS. 18(A) and 18(B), a structure is formed to have predetermined hollow portions 181 therein, with a cross section including concave and convex portions, by a blow molding technique. A plate-like member 191A (FIG. 19(B)) or 191B(FIG. 19(C)) with a predetermined recess 193 or 194 is formed to have a frame and ribs by an injection molding technique so as to be fitted with a lid plate 192 as shown in FIGS. 19(A) to 19(C). Another injection molded structure in which a core member 202 and a surface covering material 201 are formed by different materials is shown in FIGS. 20(A) and 20(B).

Furthermore, structural components containing hollow portions therein are also disclosed, for example, in Japanese Patent Laid-Open Publications Tokkaisho No. 61-155035 or Tokkaihei No. 1-204871.

However, when the stand for the television receiver is constructed by the conventional wooden structure as described above, man-hours required for NC processing or finishing are undesirably increased, if a curved configuration is employed in its external outline, thus resulting in high cost. Meanwhile, the extrusion molding process structure as referred to above cannot cope with a three-dimensional curved face design, while by the blow molding process also stated above, it is impossible to deal with a design having flat surfaces on opposite sides. Similarly, the injection molded structure requires not only separate parts to close the reverse surface, but also additional man-hours for the assembly. With respect to the injection molded structure using different materials, in the design for presenting a massive appearance by increasing thickness of plate members, the amount of molding resin is increased to a large extent with respect to the necessary strength, with a consequent high cost.

On the other hand, in Japanese Patent Laid-Open Publications Tokkaisho No. 61-155035 and Tokkaihei No. 1204871 referred to earlier, since the hollow portions are formed by a partitioning portions formed by projecting parisons inwardly by the low pressure blow molding, the structure is different from that in which the intersecting partition walls are formed as desired to provide the hollow portions in a matrix pattern.

As described so far, the conventional processing techniques and structures cannot fully cope with the diversified designs, while sufficient cost reduction is not available, since the number of parts and processing man-hours cannot be reduced.

SUMMARY OF THE INVENTION

Accordingly, an essential object of the present invention is to provide a hollow structural component which is light in weight, and reduced in an amount of resin used and in the number of parts employed therefor, with substantial elimination of disadvantages inherent in the conventional hollow structural components of this kind.

Another object of the present invention is to provide a hollow structural component of the above described type which is simple in construction and improved in the workability during assembly, with consequent reduction in cost.

In accomplishing these and other objects, according to one preferred embodiment of the present invention, there is provided a hollow structural component produced through application of a hollow injection molding technique, and comprising an integral structure, partition walls intersecting each other in an X-shape or +-shape within the integral structure, and a plurality of independent hollow portions formed as specified by the partition walls so as to be arranged within the integral structure. The integral structure is formed into one piece by one-shot molding (e.g. one-time molding utilizing the injection molding and blow molding) or by one injection molding die which is caused to slide against each other between its stationary side and movable side for post-forming (in which, for example, divided molding is first effected for subsequent formation into one piece).

By the above arrangement, in the hollow structural component according to the present invention, it is possible to construct any desired structure or curved surface shapes according to diversity in the design, and objects for use, etc., while the number of parts required may be decreased for reduction of cost in the assembly and materials.

BRIEF DESCRIPTION OF THE DRAWINGS

These and other objects and features of the present invention will become apparent from the following description taken in conjunction with the preferred embodiment thereof with reference to the accompanying drawing, in which.

DETAILED DESCRIPTION OF THE INVENTION

Figure 1:
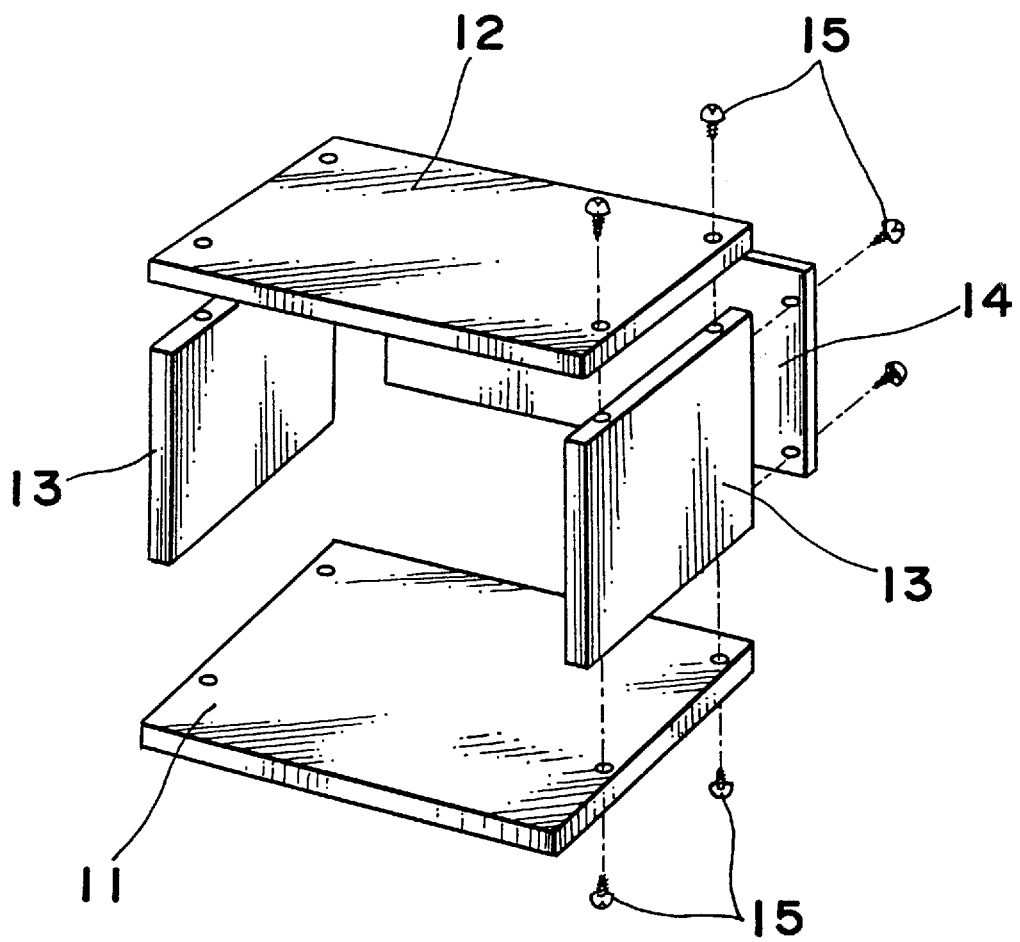
FIG. 1 is an exploded perspective view of a television receiver stand to which hollow structural components according to the present invention may be applied.

Before the description of the present invention proceeds, it is to be noted that like parts are designated by like reference numerals throughout the accompanying drawings.

A hollow structural component according to the present invention includes an integral structure in which a plurality of independent hollow portions are formed as specified by partition walls intersecting each other, and such integral structure is formed into one piece by a one-shot molding. More specifically, in the hollow structural component as referred to above, the integral structure in which the plurality of independent hollow portions are formed by the partition walls intersecting each other in an X-shape or +-shape, is molded in a manner as described hereinbelow.

(1) Formation by one-shot molding (one-time molding). By way of example, a set of hollow injection molding dies in which one die is slidably fitted into the other die is prepared and a hollow molded item is formed by enlarging the cavity of the one set of dies, while the plurality of partition plates are releasably incorporated into the die at the sliding side so as to form the partition walls intersecting in the X-shape, t-shape or +-shape or the like.

(2) For example, through employment of one molding die, respective half portions are injection-molded by a primary molding, and subsequently, by causing the injection molding die which formed the respective half portions to slide against each other between the stationary side and movable side for a secondary molding, the respective half portions are coupled to each other by the secondary molding resin material for the integral molding.

More specifically, as shown in FIGS. 21 to 25, the integral structure plate 300 includes two hollow structure plate halves or half portions 301 and. 302 formed by the primary molding and combined with each other by a secondary molding resin material (not shown), with independent hollow portions 303 and 304 being formed inside in the aligned state.

The half portions 301 and 302 are provided with grooves 307 formed in the partition walls 305 of the half portion 301 and corresponding portions in the mating half portions 302, and also., with stepped recesses 306 on a peripheral end face of the half portion 301, and a corresponding portion in the half portion 302 as illustrated. Procedures for the primary molding and secondary molding are as described above. It is to be noted that the above two injection molding is constituted by simultaneous use of the injection molding method and the blow molding method for blowing the nitrogen gas and the like, or single use of the injection molding method.

Referring now to the drawings, there is shown in FIG. 1, a stand for a television receiver to which the present invention may be applied, and which includes five hollow structural components, i.e. a bottom plate 11, a top plate 12, side plates 13, and a rear plate 14 combined to each other by tightening screws 15 for assembly.

Referring further to FIGS. 2(A) to 15(B) showing various embodiments according to the present invention, all of the hollow structural components shown therein are formed by the one-shot molding (one-time molding) or through integral molding by one molding die as an integral structure having a plurality of independent hollow portions therein based on the injection molding or simultaneous use of the injection molding or blow molding, without requiring joining or assembling of parts themselves.

Figure 2A:
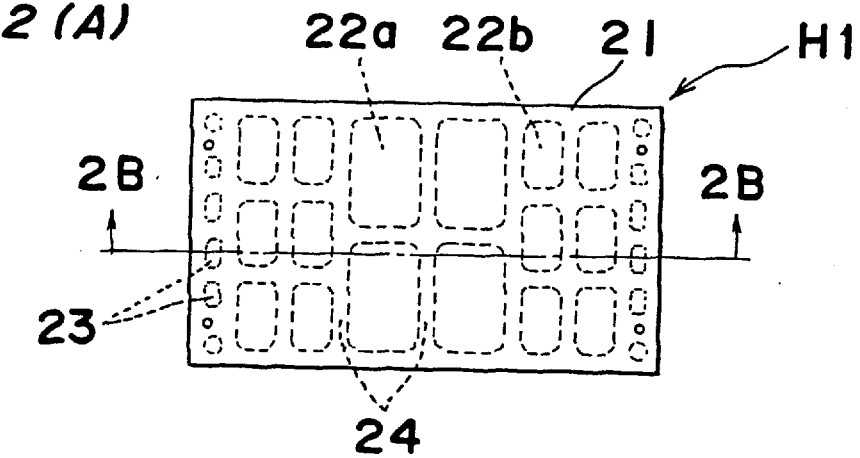
FIG. 2(A) is a top plan view of a hollow structural component according to a first embodiment of the present invention.
Figure 2B:
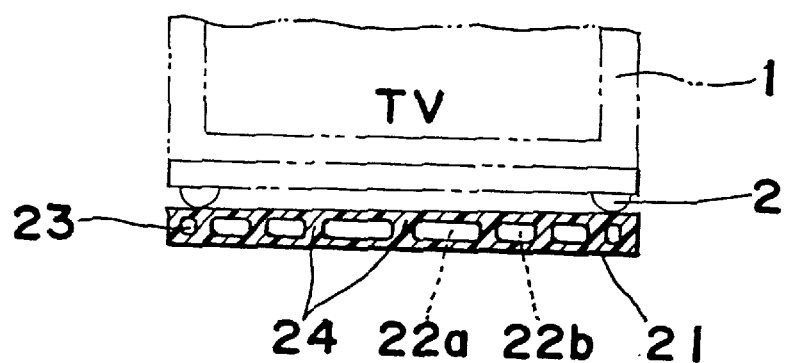
FIG. 2(B) is a cross section taken along the line 2B—2B in FIG. 2(A)

In FIGS. 2(A) and 2(B), there is shown a hollow structural component H1 constituting a top plate 21 of a television receiver stand according to a first embodiment of the present invention.

The top plate 21 having construction intended to achieve light weight, includes hollow portions 23 with small volumes disposed at portions requiring sufficient strength, i.e. at side portions located below leg portions 2 of the television receiver 1 and subjected to a large load, and hollow portions 22a and 22b disposed at portions not directly subjected to load, and these hollow portions 22a,22b and 23 are arranged in a symmetrical shape as specified, by intersecting partition plates or partition walls 24. In the above embodiment, three kinds of hollow portions different in sizes are aligned in the symmetrical shape, thereby to reduce the weight of the top plate 21. By setting the total volume occupied by the hollow portions 22a,22b and 23 to be 20 to 90% of the volume occupied by the external shape of the top plate 21, the resin material to be used may be reduced in the amount for cost reduction.

The total volume to be occupied by the hollow portions may be properly determined according to the object for use, strength required and resin materials constituting the hollow structural components.

Figure 3A:
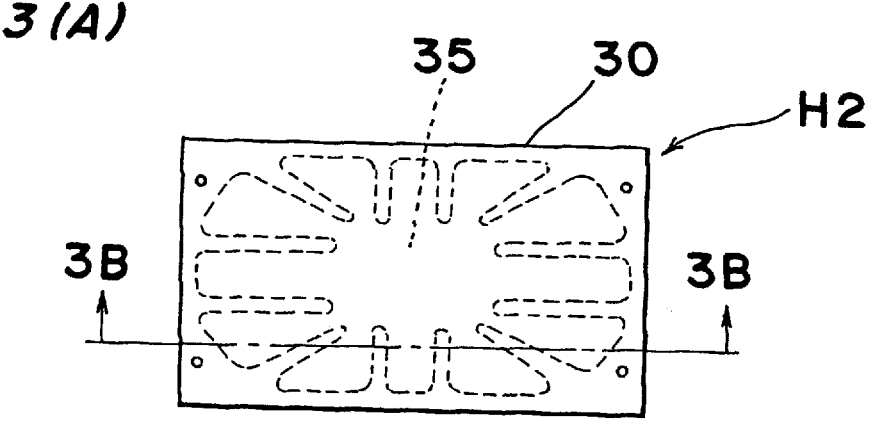
FIG. 3(A) is a top plan view of a hollow structural component according to a second embodiment of the present invention.
Figure 3B:
FIG. 3(B) is a cross section taken along the line 3B—3B in FIG. 3(A)
Figure 4:
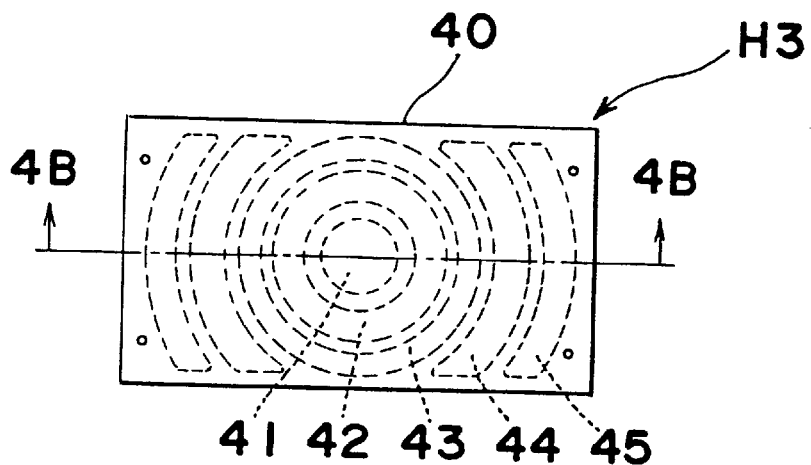
FIG. 4(A) is a top plan view of a hollow structural component according to a third embodiment of the present invention.
FIG. 4(B) is a cross section taken along the line 4B—4B in FIG. 4(A)
Figure 4:
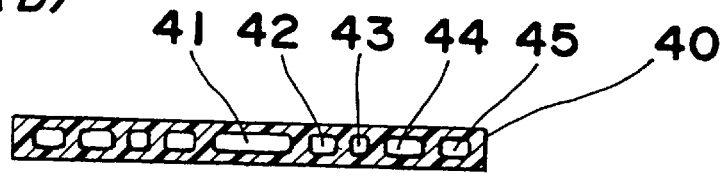
Figure 5:
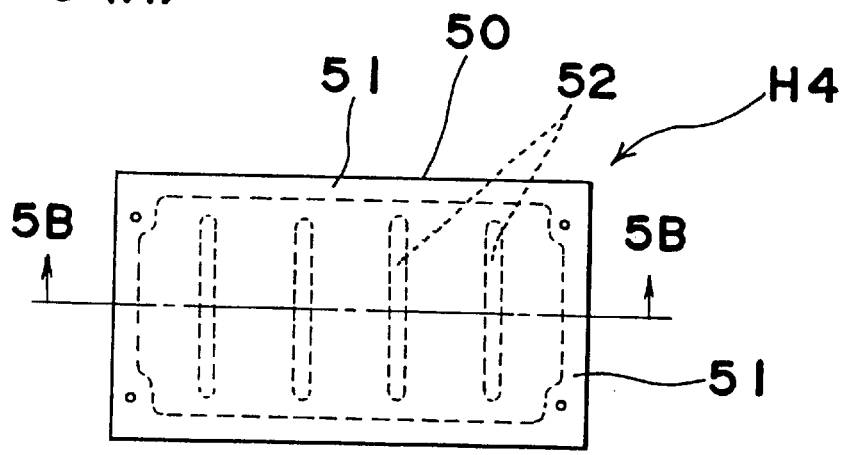
FIG. 5(A) is a top plan view of a hollow structural component according to a fourth embodiment of the present invention.
FIG. 5(B) is a cross section taken along the line 5B—5B in FIG. 5(A)
Figure 5:
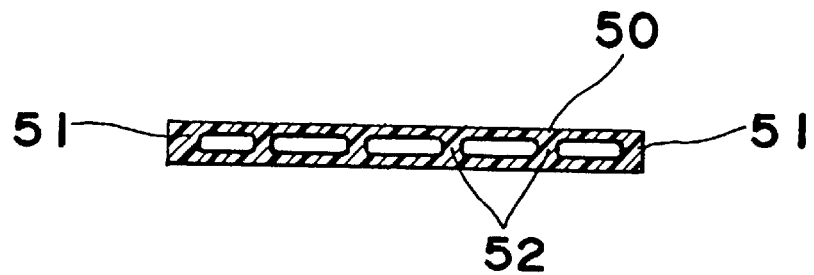

In FIGS. 3(A) and 3(B), there is shown a hollow structural component H2 constituting an integral structure 30 according to a second embodiment of the present invention, which may be used for a top plate, bottom plate or side plate of a television receiver stand and the like.

The integral structure 30 in FIGS. 3(A) and 3(B) is also intended to achieve light weight, and also to disperse the load generally uniformly when the load is applied generally evenly over the entire surface of the structural component, thereby to prevent formation of warping or twisting, etc. on the molded item. For such purpose, the integral structure 30 is formed therein with a hollow portion 35 which has a shape generally radially extending from a central portion towards an outer peripheral portion of said integral structure 30 as shown.

In a hollow structural component H3 in FIGS. 4(A) and 4(B) according to a third embodiment of the present invention, the integral structure 40 has for its object to reduce weight, and to disperse stress when a load is concentrated at the central portion of the structure 40 for prevention of warping or twisting in the molded item. For this purpose, the integral structure 40 is formed therein with a circular hollow portion 41, annular hollow portions 42 and 43, and arcuate hollow portions 44 and 45 provided in a state of concentric circles from the central portion towards the outer peripheral portion of the hollow structure 40.

In a hollow structural component H4 in FIGS. 5(A) and 5(B) representing a fourth embodiment of the present invention, the integral structure 50 which may constitute a top plate, bottom plate or side plates, etc. of a television receiver stand and the like, is intended to reduce weight, and also to properly disperse a load when the load is applied to the peripheral portion of the integral structure 50. For this purpose, the thickness of the side wall 51 at the peripheral edge is made larger than the thickness of each of four reinforcing ribs 52 formed at the middle portion of the integral structure 50 for preventing the molded item from being warped or twisted.

Figure 6:
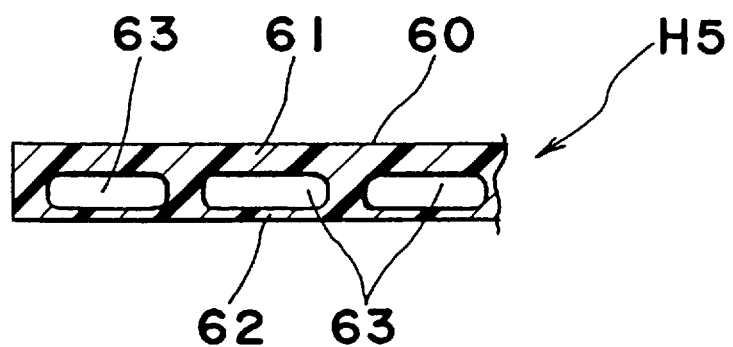
FIG. 6 is a cross section of a hollow structural component according to a fifth embodiment of the present invention.

Referring further to FIG. 6, there is shown a hollow structural component H5 according to a fifth embodiment of the present invention. In this embodiment, the thickness of the surface layer in the integral structure 60 is caused to be deviated according to the function required. More specifically, in the application as a top plate of a television receiver stand, the integral structure 60 is made thick in the upper face layer 61 for placing the television receiver thereon, thereby to provide sufficient strength, while the lower face layer 62 not directly applied with the load and merely required to have a good appearance is made thin as far as possible so as to achieve weight reduction on the whole. The proper setting of the layer thickness and sizes of hollow portions 63 as specified depending on the portions by deviating the layer thickness as referred to above instead of making the layer thickness constant, may be effected by taking into consideration, temperature conditions such as environmental temperatures during use as well as the load conditions to be applied to the integral structure. For example, the setting as referred to above may be effected according to the objects and functions by increasing the layer thickness at the side contacting the high temperature appliances, high temperature fluids, etc. or by making the size of the hollow portions larger than those at other portions for the purpose of heat insulation, etc.

Figure 7:
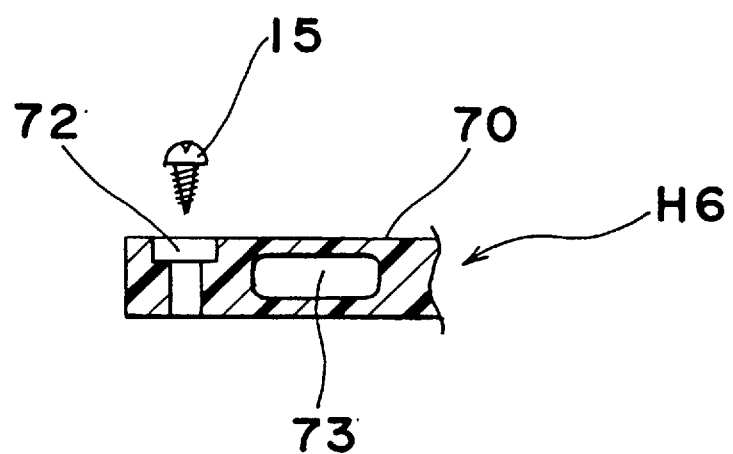
FIG. 7(A) is a fragmentary cross section of a hollow structural component according to a sixth embodiment of the present invention.
Figure 8:
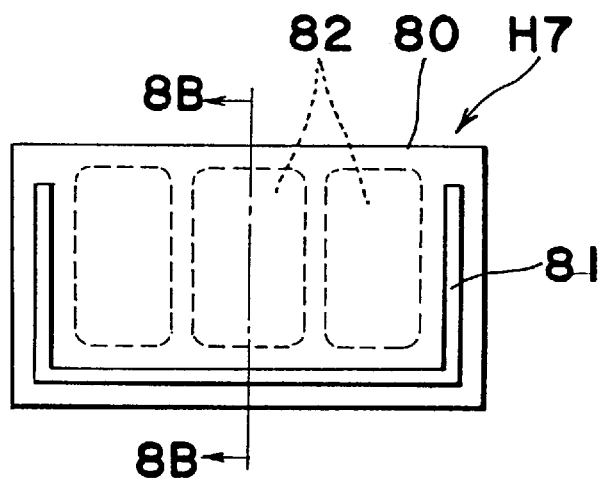
FIG. 8(A) is a top plan view of a hollow structural component according to a seventh embodiment of the present invention.
FIG. 8(B) is a cross section taken along the line 8B—8B in FIG. 8(A)
Figure 8:
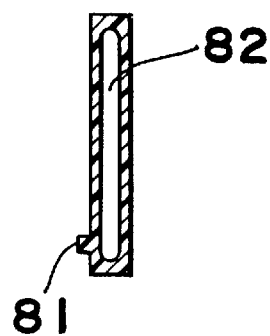
Figure 9:
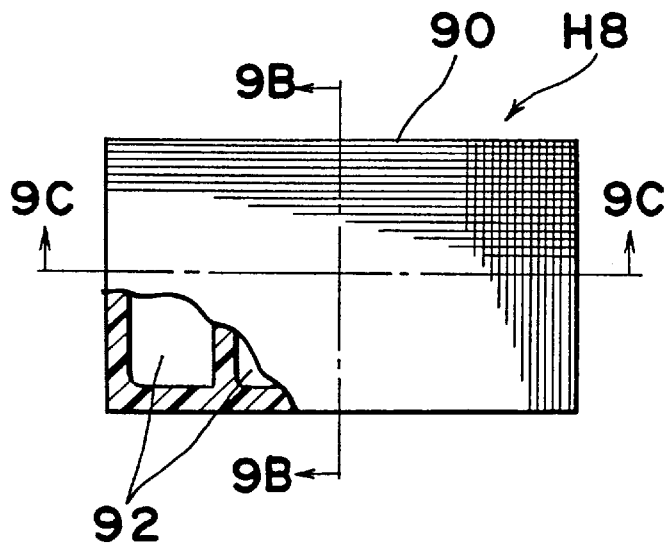
FIG. 9(A) is a top plan view of a hollow structural component according to an eighth embodiment of the present invention.
FIG. 9(B) is a cross section taken along the line 9B—9B in FIG. 9(A)
FIG. 9(C) is a cross section taken along the line 9C—9C in FIG. 9(A)
Figure 9:
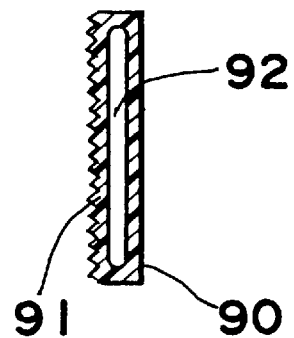
Figure 9:
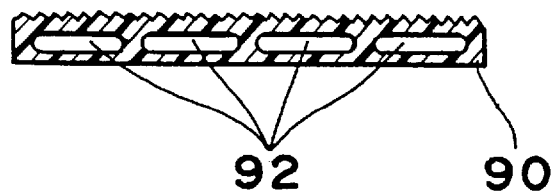

A hollow structural component H6 according to a sixth embodiment of the present invention as shown in FIG. 7 provides an integral structure 70 suitable for assembling and combining as hollow structural members constituting the television receiver stand. In the assembling of the television receiver stand as referred to earlier in FIG. 1, many tightening screws 15 are used, and naturally, no hollow portions are provided at the combining portion of the hollow structural components. In the hollow structural component H6 in FIG. 7, four stepped through-holes 72 are formed as specified at four corner portions of the integral structure 70 by also taking into account, positioning between the structural components, and the hollow portions 73 are provided close to the stepped through-holes 72 in positions where no problem is brought about with respect to strength.

FIGS. 8(A) and 8(B) show a hollow structural component H7 according to a seventh embodiment of the present invention, while FIGS. 9(A), 9(B) and 9(C) represent another hollow structural component H8 for an eighth embodiment of the present invention.

In the hollow structural component H7 in FIGS. 8(A) and 8(B), the integral structure 80 includes three rectangular hollow portions 82 formed therein for reduction of weight, while a fitting protrusion 81 is formed in approximately a U-shape on the surface of the integral structure H7 along its front and side edges as shown for slippage prevention when the television receiver is placed on the structural component.

Meanwhile, in the hollow structural component H8 in FIGS. 9(A) to 9(C), the integral structure 90 has four rectangular hollow portions 92 formed therein to reduce weight, and a knurled state undulation 91 formed over the surface of the integral structure for slippage prevention as in the seventh embodiment.

The fitting protrusion 81 and the undulation 91 referred to above may be integrally formed simultaneously with the molding of the hollow structural component main body.

Figure 10A:
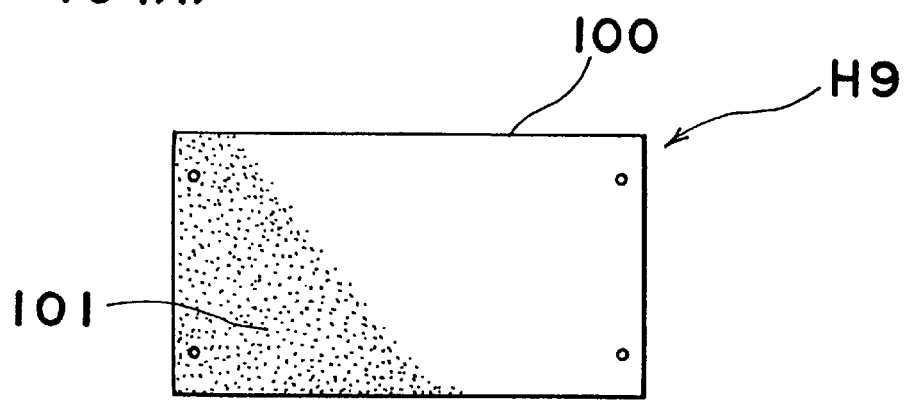
FIG. 10(A) is a top plan view of a hollow structural component according to a ninth embodiment of the present invention.
Figure 10B:
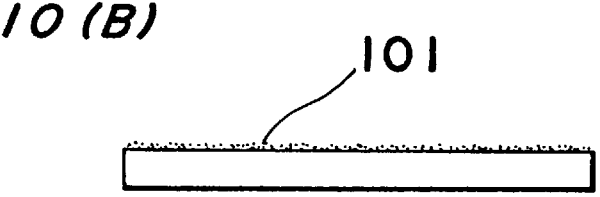
FIG. 10(B) is a side elevational view of the hollow structural component in FIG. 10(A)

In the hollow structural component H9 in FIGS. 10(A) and 10(B), the integral structure 100, which may be of any of the hollow structure components in FIGS. 2. (A) to 5B described earlier, is coated over its upper surface with a decorative processing such as graining 101, etc. for improvement of quality in the design and appearance. Such grain formation may be integrally effected simultaneously with the molding of the hollow structural component main body.

Figure 11:
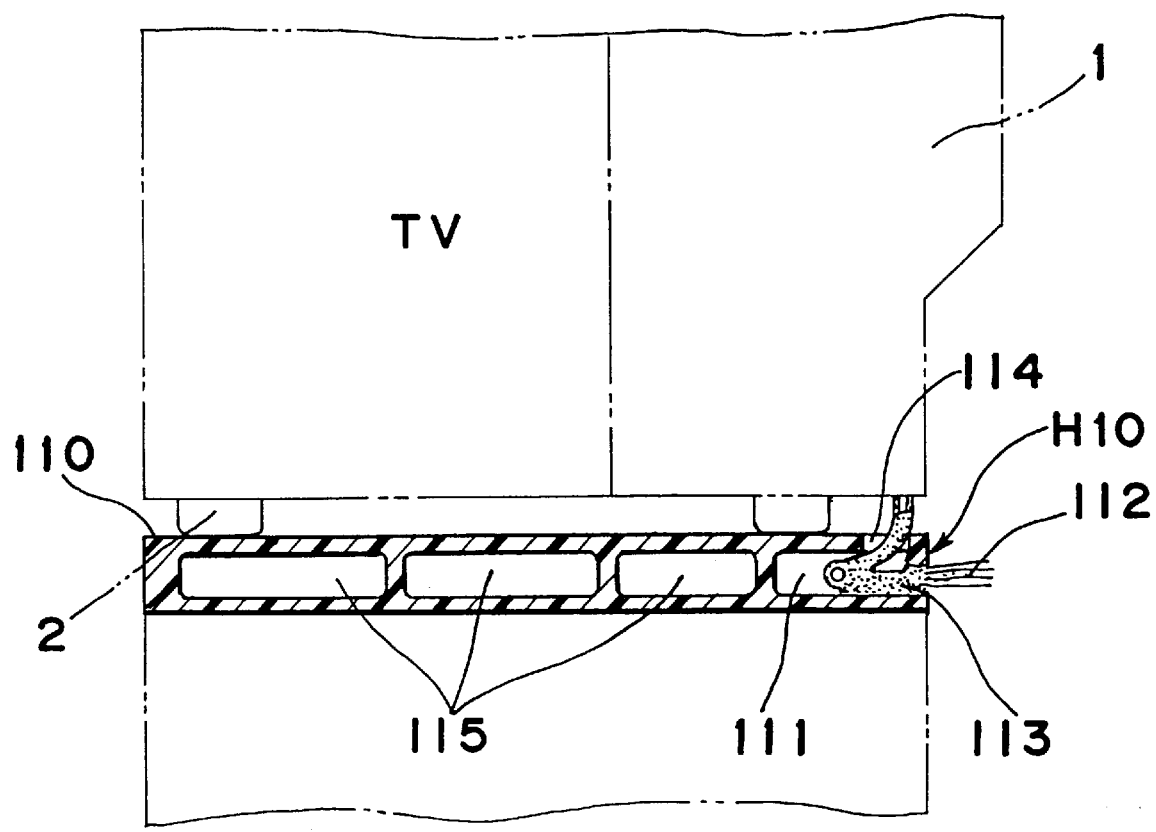
FIG. 11 is a side sectional view of an essential portion of a hollow structural component according to a tenth embodiment of the present invention, with neighboring items in the actual use being partly shown in dashed lines for clarity.

With respect to the hollow structural component H10 in FIG. 11 according to a tenth embodiment of the present invention, shown together with a television receiver 1 placed thereon, the integral structure 110 has a plurality of hollow portions 115, and a pocket 111 for accommodating a power supply cord 112 or the like therein is also provided adjacent to an edge portion of the integral structure, through-holes 114 and 113 are formed in the upper and lower walls respectively for passing the power supply cord 112 therethrough. By providing the accommodating pocket 111 as referred to above, accessories such as the power supply cord, etc. of the television receiver may be accommodated in the pocket 111 for a neat appearance, while a separate securing part for the power supply cord or the like may be dispensed with.

Figure 12:
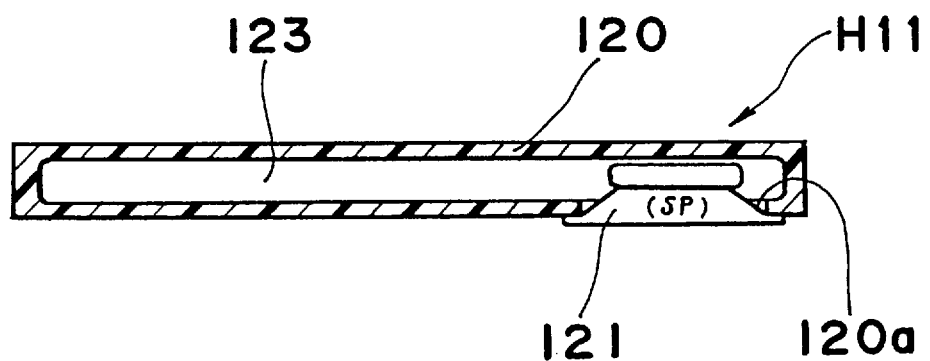
FIG. 12 is a side sectional view of an essential portion of a hollow structural component according to an eleventh embodiment of the present invention.

Referring further to FIG. 12, there is shown a hollow structural component H11 according to an eleventh embodiment of the present invention, in which one of a plurality of hollow portions 123 formed in the integral structure 120 is opened as at 120a, and a loud speaker 121 is provided in said opening 120a, thereby to utilize the integral structure 120 as a loud speaker box.

Figure 13:
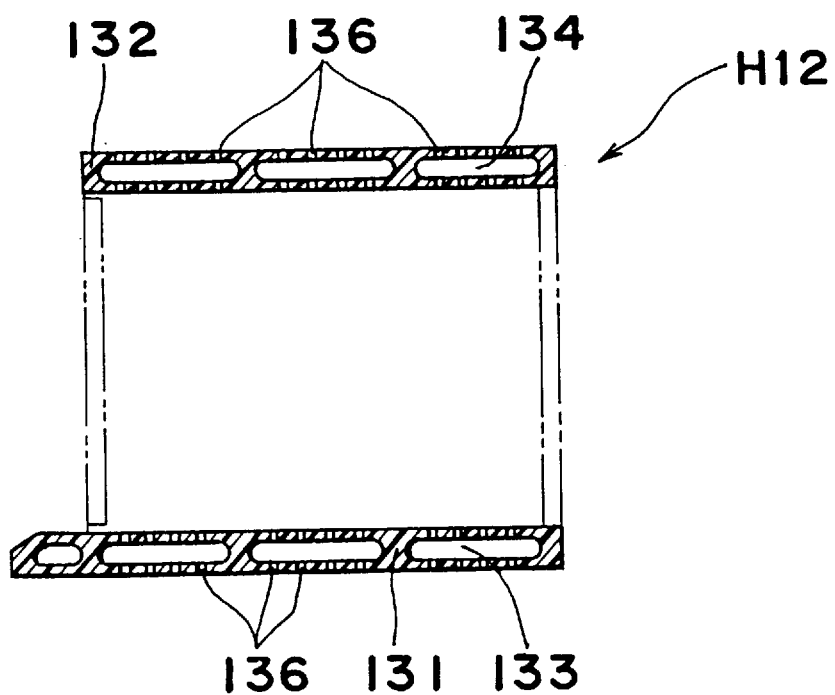
FIG. 13 is a side sectional views of hollow structural components according to a twelfth embodiment of the present invention.

The hollow structural component H12 according to a twelfth embodiment as shown in FIG. 13 includes a top structure 132 having a plurality of hollow portions 134 formed therein, and a bottom structure 131 also having a plurality of hollow portions 133 formed therein. The top structure 132 and the bottom structure 131 have a large number of small heat radiating holes 136 formed in the walls thereof, and communicated with the hollow portions 133 and 134 as shown, thereby to efficiently effect heat radiation of appliances such as a video tape recorder or amplifier, etc. (not particularly shown) accommodated within the television receiver stand 1.

Figure 14A:
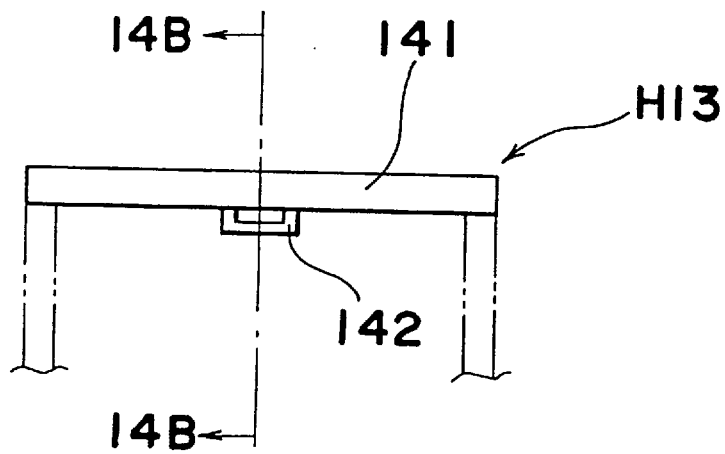
FIG. 14(A) is a front elevational of a hollow structural component according to a thirteenth embodiment of the present invention.
Figure 14B:
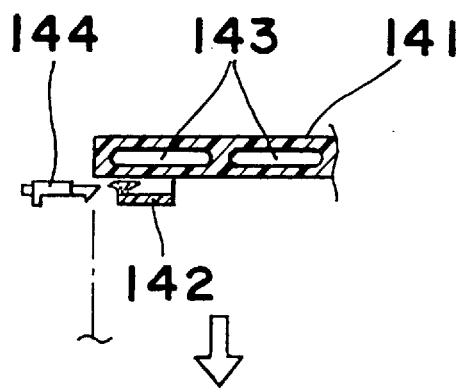
FIG. 14(B) is a fragmentary cross section taken along the line 14B—14B in FIG. 14(A) before insertion of a magnet catch.
Figure 14C:
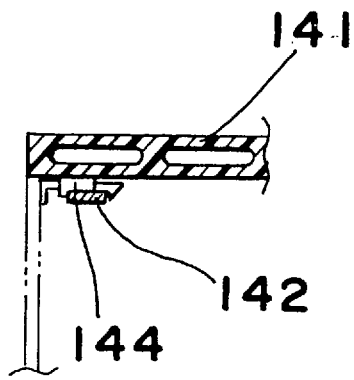
FIG. 14(C) is a cross section similar to FIG. 14(B), after insertion of the magnet catch.
Figure 15:
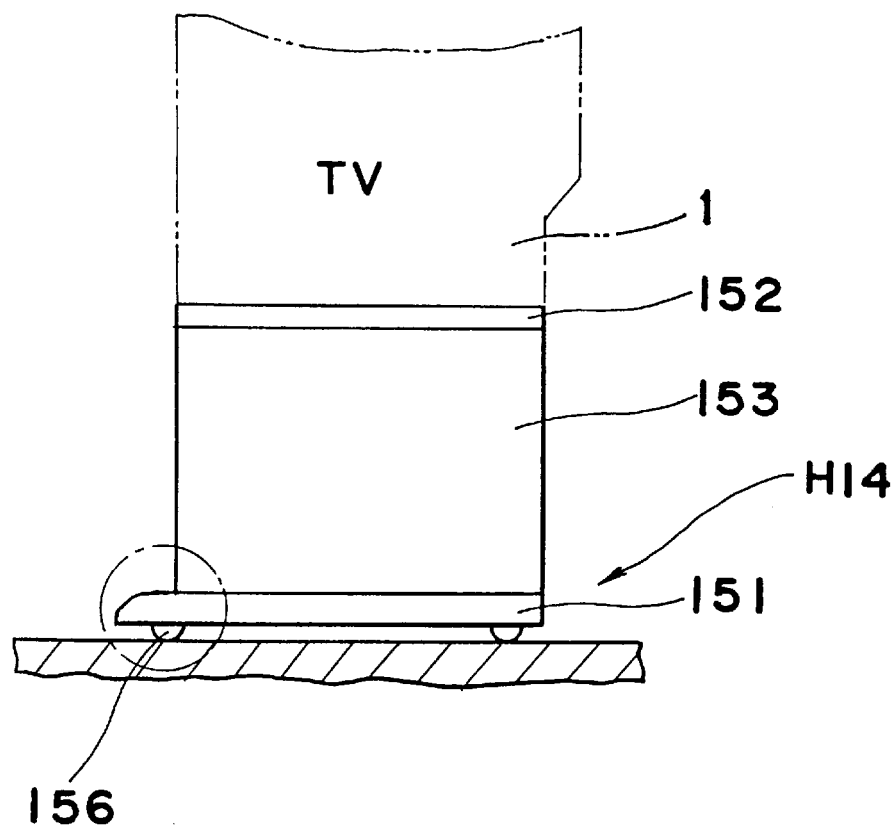
FIG. 15(A) is a side elevational view of hollow structural components according to a fourteenth embodiment of the present invention, with neighboring items shown by chain lines for clarity.
FIG. 15(B) is a fragmentary side elevational view showing on an enlarged scale, a leg portion in the embodiment of FIG. 15(A)
Figure 15:
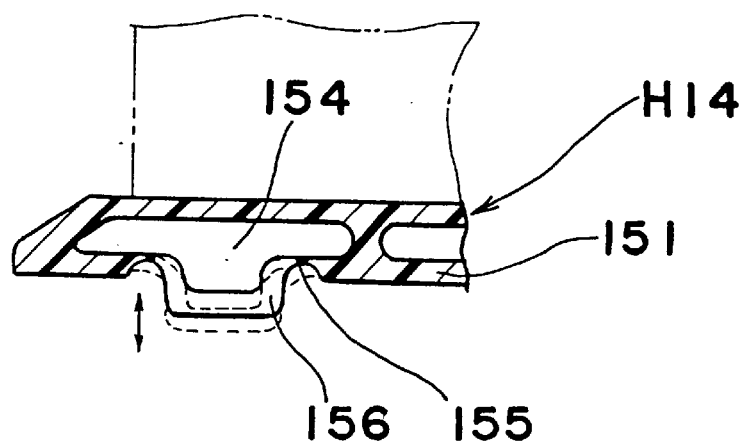
Figure 16A:
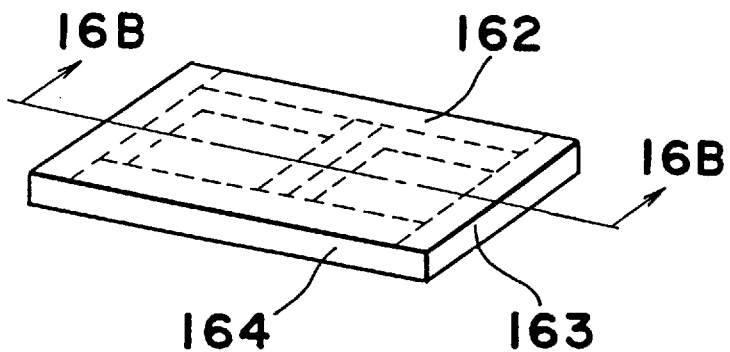
FIG. 16(A) is a perspective view of a first conventional hollow structural component (already referred to)
Figure 16B:
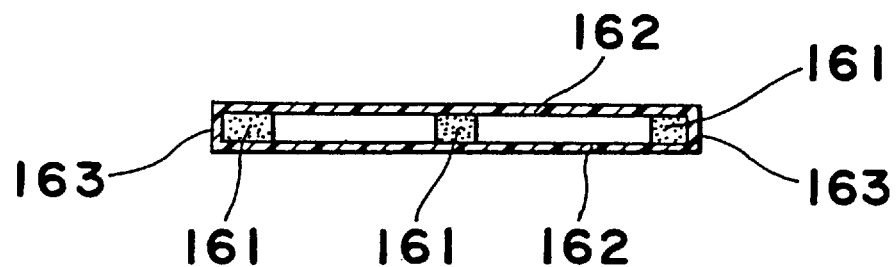
FIG. 16(B) is a cross section taken along the line 16B—16B in FIG. 16(A)
Figure 17:
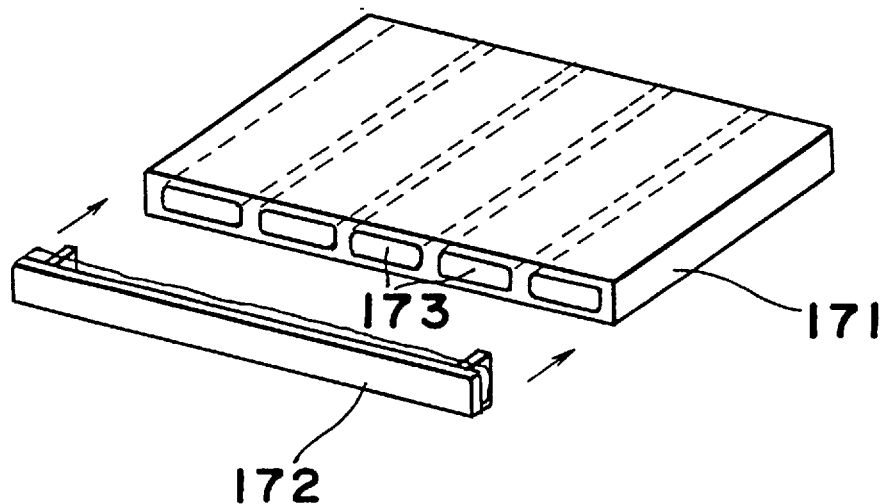
FIG. 17 is an exploded perspective view of a second conventional hollow structural component, (already referred to)
Figure 18A:
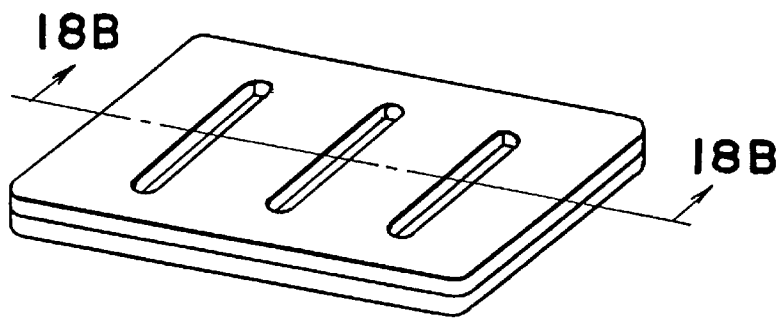
FIG. 18(A) is a perspective view of a third conventional hollow structural component (already referred to)
Figure 18B:
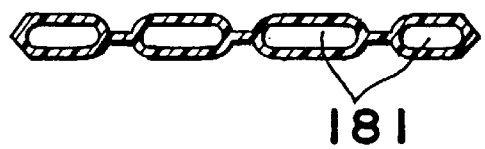
FIG. 18(B) is a cross section taken along the line 18B—18B in FIG. 18(A)
Figure 19A:
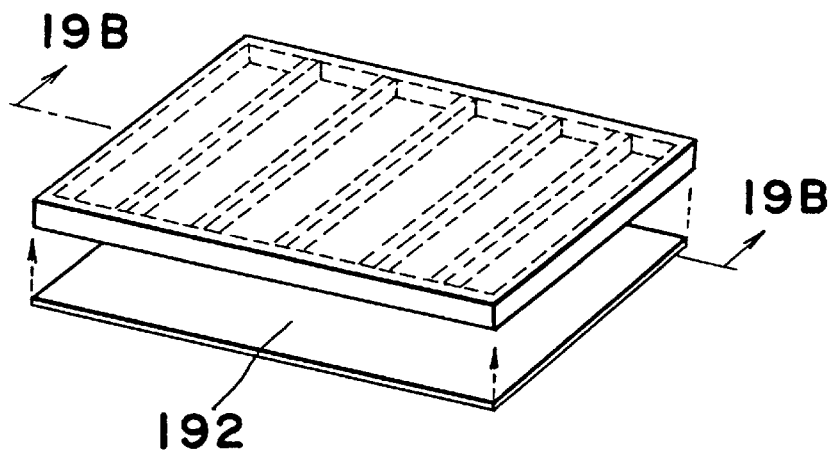
FIG. 19(A) is an exploded perspective view of a fourth conventional hollow structural component (already referred to)
Figure 19B:
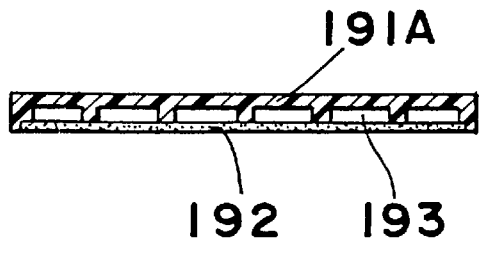
FIG. 19(B) is a cross section taken along the line 19B—19B in FIG. 19(A)
Figure 19C:
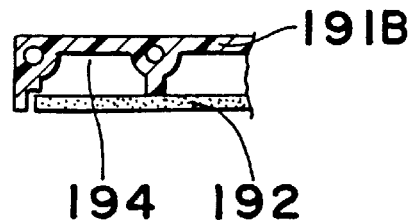
FIG. 19(C) is a fragmentary cross section showing a modification of the fourth conventional embodiment of FIG. 19(A) (already referred to)
Figure 20A:
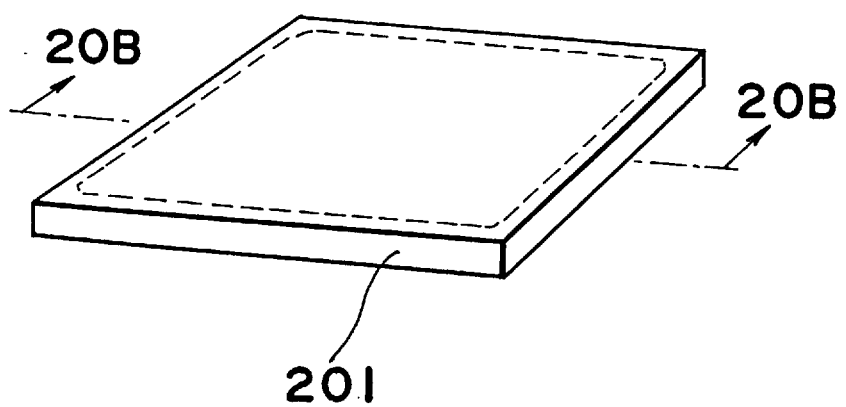
FIG. 20(A) is a perspective view of a fifth conventional hollow structural component (already referred to)
Figure 20B:
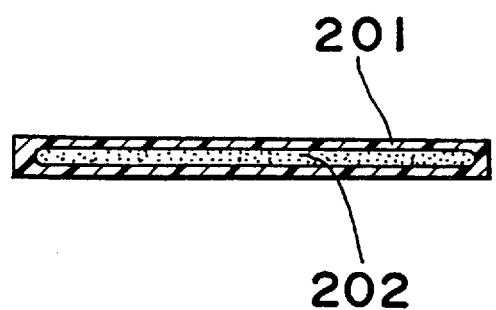
FIG. 20(B) is a cross section taken along the line 20B—20B in FIG. 20(A)
Figure 21:
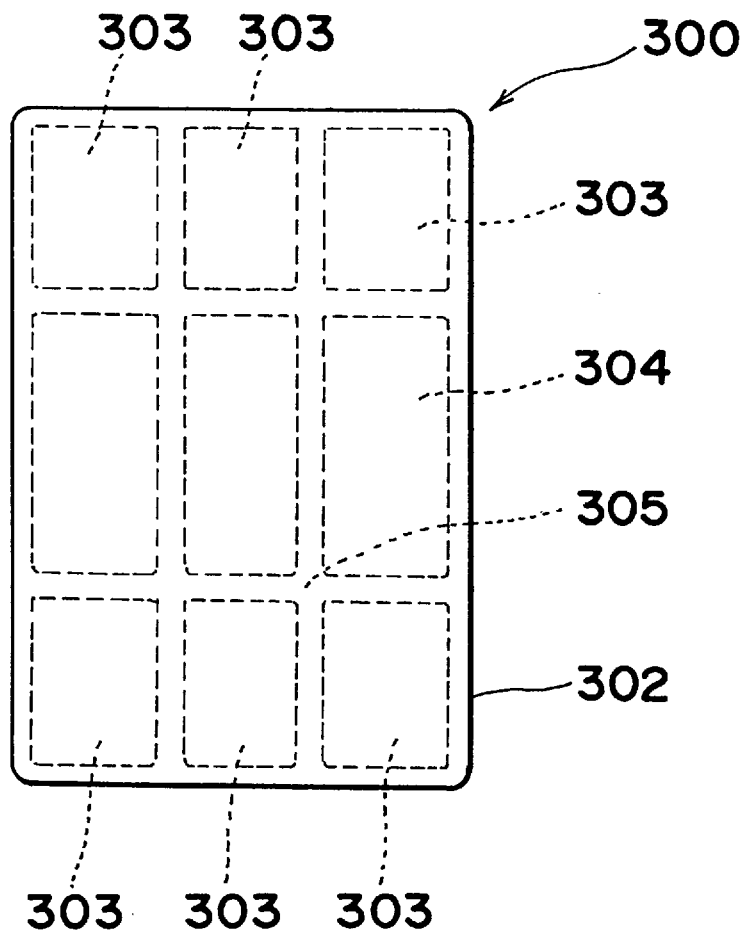
FIG. 21 is a top plan view of a hollow structure plate for explaining the molding process in an embodiment of the present invention.
Figure 22:
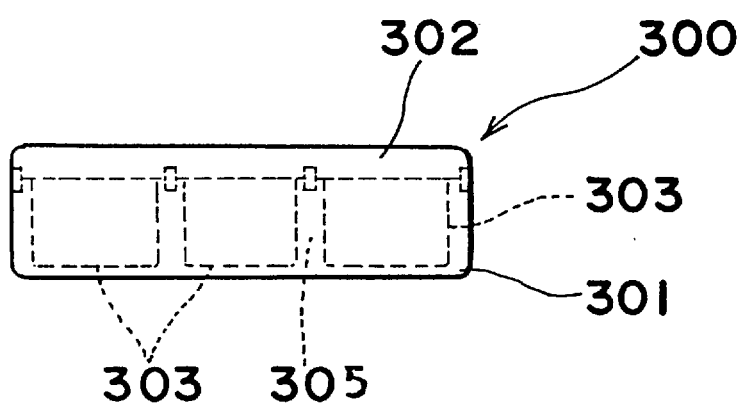
FIG. 22 is a front elevational view of the hollow structure plate in FIG. 21, FIGS. 23(A) to 23(C) are side sectional diagrams of the hollow structure plate for explaining procedures of the molding process in an embodiment of the present invention.
Figure 23:
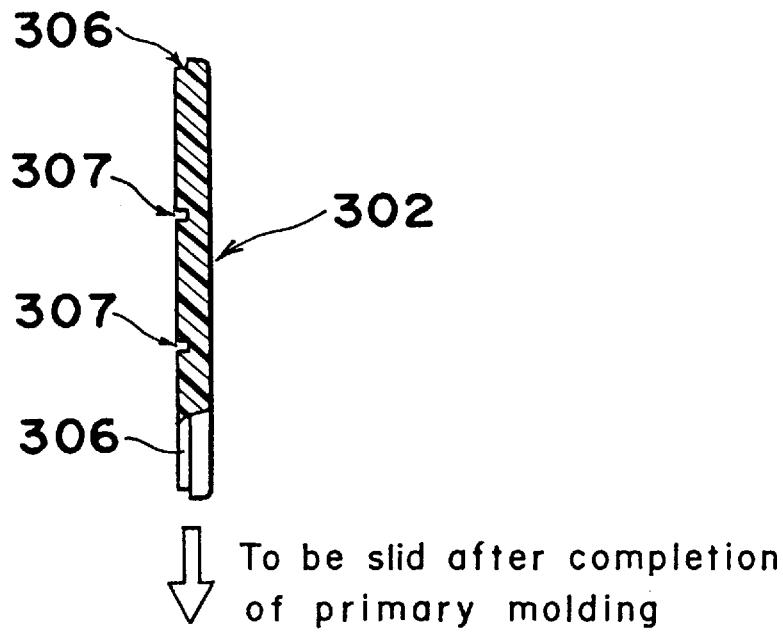
Figure 23:
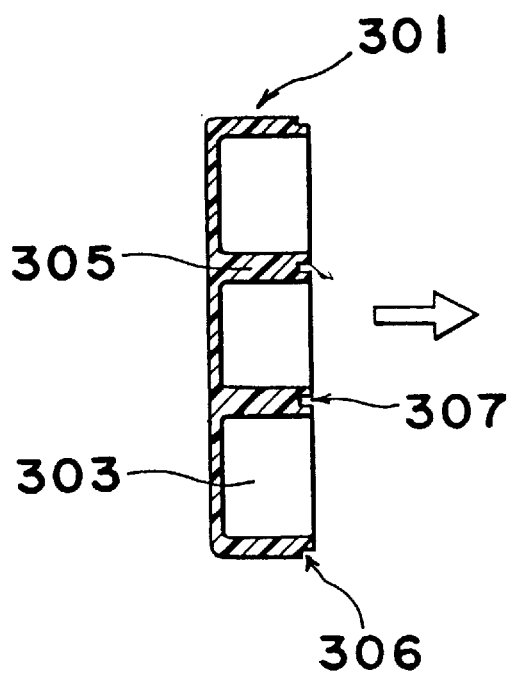
Figure 23:
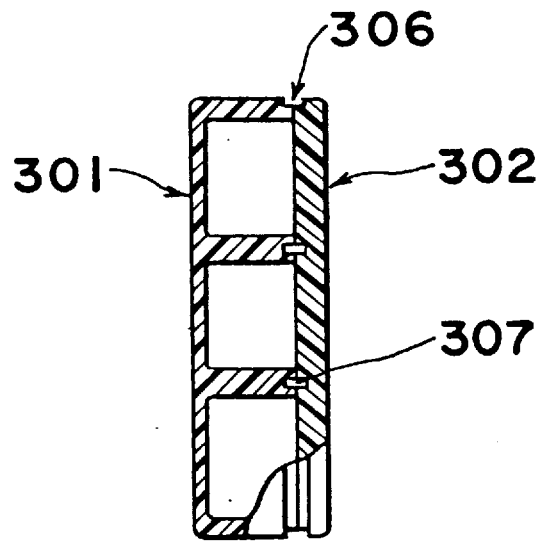
Figure 24:
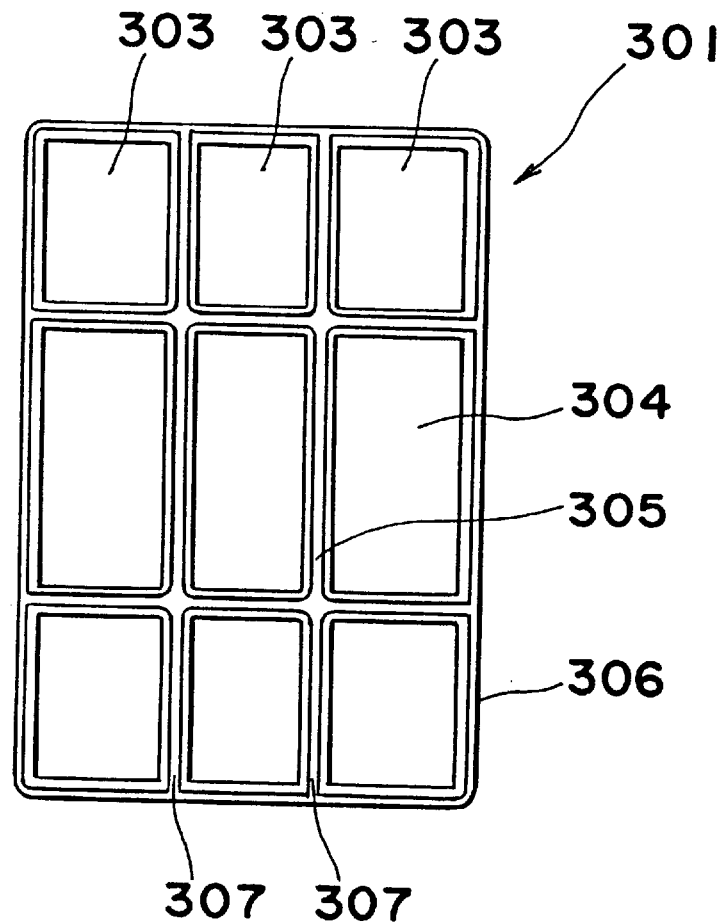
FIG. 24 is a top plan view of the hollow structure plate of FIG. 21, with an upper half thereof removed for clarity.
Figure 25:
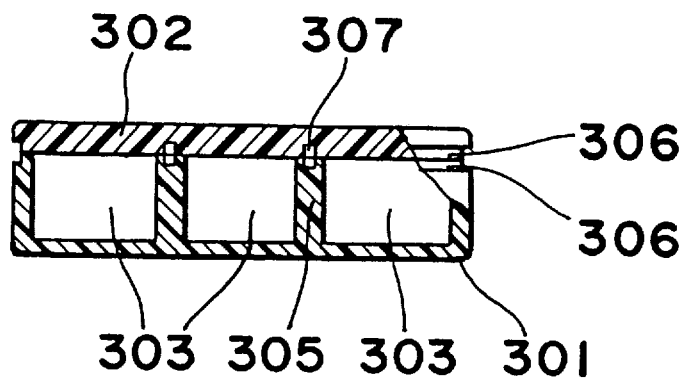
FIG. 25 is a cross section of the hollow structure plate of FIG. 24 as viewed from the front side, with its upper half applied thereon.

FIGS. 14(A) to 14(C) show the hollow structural component H13 according to a thirteenth embodiment of the present invention, and a part fitting frame portion 142 is integrally formed at part of an integral structure 141 having hollow portions 143 therein and constituting a top plate 141 of the television receiver stand. The frame portion 142 has a predetermined rectangular through-hole for receiving a magnet catch 144 therein in one operation. FIG. 14(B) shows the state before insertion of the magnet catch 144 into the frame portion 142, while FIG. 14(C) represents the state after insertion thereof.

The above part fitting frame portion 142 may also be integrally formed with the hollow structural component main body in the similar manners in the embodiments of FIGS. 8(A) to 9(C) described earlier.

In the hollow structural component H14 according to a fourteenth embodiment of the present invention constituting a bottom plate 151 of the television receiver stand also having a top plate 152 and side plate 153, the integral structure for the bottom plate 151 is provided with elastic leg portions 156 formed at four predetermined portions of said integral structure 151 for absorbing vibrations. For each of the elastic leg portions 156, a hollow portion 154 having a generally T-shaped cross section is provided at each of the four corners of the integral structure 151, and arcuate thin wall portions 155 are symmetrically provided as shown in FIG. 15(B) so as to impart elasticity as in a compression spring. When the elastic leg portion 156 is subjected to external vibrations, it is deflected from a position indicated by a dotted line to a position represented by a solid line in the direction of arrows for absorbing and reducing vibration.

According to the embodiments of the present invention as described so far, by either arranging the hollow portions in the same configuration and same volume in an aligned state or arranging a plurality of hollow portions different in sizes in symmetrical or concentric shapes, weight reduction of the apparatus constituting components and reduction of the amount of resin used may be achieved with consequent reduction in cost. Moreover, by the one-shot molding as the integral structure or by integrally molding the integral structure with one molding die, reduction in the number of parts involved and in the man-hours required can also be achieved.

Moreover, by setting the size and shape of the hollow portions as specified, required mechanical strength may be obtained as desired by changing values according to parts of the same structural component, while moreover, elastic structural parts, mounting parts holding members, and fitting projections, etc. can be molded simultaneously. Additionally, it is possible to constitute audio and video appliances through combining with loud speakers and the like. It is also possible to prevent deformation such as warping, twisting, etc., by deviating thickness of the surface layer through deviation of the position of the hollow portion to be disposed in the hollow structural component from the center of the thickness of the structural component.

Furthermore, when the apparatus is constituted by the hollow structural component formed with heat radiation holes on the surface wall for communication with the hollow portions, heat radiation of the apparatus disposed therein may be effected in an efficient manner.

In addition, by applying the decorative processing over the upper surface of the hollow structural component, the design quality may be improved, and slippage can be prevented.

It should be noted here that in the foregoing embodiments, although the present invention is described with reference to the hollow structural components for constituting the stand for the television receiver, the concept of the present invention is not limited in its application to such apparatus or device for the electronic equipment alone, but may be readily utilized as structural components in any field of industry.

As is clear from the foregoing description, according to the hollow structural components of the present invention, not only the weight reduction of the components constituting the television receiver stand or the like is obtained, but cost reduction to a large-extent can also be achieved with reduction in the number of parts and improvement in the workability during assembly.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

Moreover, by setting the size and shape of the hollow portions as specified, required mechanical strength may be obtained as desired by changing values according to parts of the same structural component, while moreover, elastic structural parts, mounting parts holding members, and fitting projections, etc. can be molded simultaneously. Additionally, it is possible to constitute audio and video appliances through combining with loud speakers and the like. It is also possible to prevent deformation such as warping, twisting, etc., by deviating thickness of the surface layer through deviation of the position of the hollow portion to be disposed in the hollow structural component from the center of the thickness of the structural component.

Furthermore, when the apparatus is constituted by the hollow structural component formed with heat radiation holes on the surface wall for communication with the hollow portions, heat radiation of the apparatus disposed therein may be effected in an efficient manner.

In addition, by applying the decorative processing over the upper surface of the hollow structural component, the design quality may be improved, and slippage preventing function can be added.

It should be noted here that in the foregoing embodiments, although the present invention is described with reference to the hollow structural components for constituting the stand for the television receiver, the concept of the present invention is not limited in its application to such apparatus or device for the electronic equipment alone, but may be readily utilized as structural components in any field of industry.

As is clear from the foregoing description, according to the hollow structural components of the present invention, not only the weight reduction of the components constituting the television receiver stand or the like is obtained, but cost reduction to a large-extent can also be achieved with reduction in the number of parts and improvement in the workability during assembly.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A hollow structural component which comprises an integral unitary structure, and a hollow portion of an approximate radial pattern formed within said integral structure, said integral structure being formed by one-shot molding.

2. A hollow structural component which comprises an integral unitary structure, and a plurality of hollow portions in the form of concentric circles formed within said integral structure, said integral structure being formed by one-shot molding.

* * * * *

UNITED STATES PATENT AND TRADE MARK OFFICE
CERTIFICATE OF CORRECTION

PATENT NO. : 5,807,617
DATED : September 15, 1998
INVENTOR(S) : Shiota et al.

It is certified that error appears in the above-identified patent and that said Letters Patent is hereby corrected as shown below:

On the title page: Item

[62], after "Division of Ser. No. 231,581, Apr. 20, 1994, abandoned", insert --which is a continuation of Ser. No. 826,453, Jan 27. 1992, abandoned.--

Signed and Sealed this

Twenty-seventh Day of April, 1999

*Attest:*

Q. TODD DICKINSON

*Attesting Officer*   *Acting Commissioner of Patents and Trademarks*